United States Patent [19]
Middlebrook

[11] Patent Number: 5,224,459
[45] Date of Patent: Jul. 6, 1993

[54] SUPERCHARGER

[76] Inventor: James Middlebrook, 5351 Bonsai Ave., Moorpark, Calif. 93021

[21] Appl. No.: 720,412

[22] Filed: Jun. 25, 1991

[51] Int. Cl.$^5$ .............................................. F02B 33/00
[52] U.S. Cl. .............................. 123/559.1; 123/195 A; 474/113; 474/133
[58] Field of Search ........... 123/198 R, 198 C, 195 A, 123/DIG. 7, 559.1; 403/3; 474/113, 114, 133

[56] References Cited

U.S. PATENT DOCUMENTS

| | | | |
|---|---|---|---|
| 2,741,234 | 4/1956 | Wiseman | 123/559.1 |
| 4,064,613 | 12/1977 | Simms | 474/113 X |
| 4,767,383 | 8/1988 | St. John | 474/133 |
| 5,085,199 | 2/1992 | Sado et al. | 123/559.1 |

FOREIGN PATENT DOCUMENTS 696729 9/1953 United Kingdom ............. 123/559.1

*Primary Examiner*—Michael Koczo
*Attorney, Agent, or Firm*—Wagner & Middlebrook

[57] ABSTRACT

A centrifugal supercharger system for an internal combustion is directly driven by the associated engine and includes a belt driven drive pulley and bracket for locating an idler pulley for tensioning the belt. A plurality of bosses on the housing plus arcuate slots on the bracket provide for flexibility in locating the idler pulley. The drive pulley drives a gear which engages a driven gear on a separate shaft carrying the compressor wheel which is driven at a multiple of engine speed within a volute. The compressor wheel is recessed into an internal wall of the housing to provide smooth flow of air from the compressor wheel into the volute. Another group of bosses on said housing cooperate with an engine mounted bracket to provide flexibility in mounting the supercharger on various engines.

12 Claims, 5 Drawing Sheets

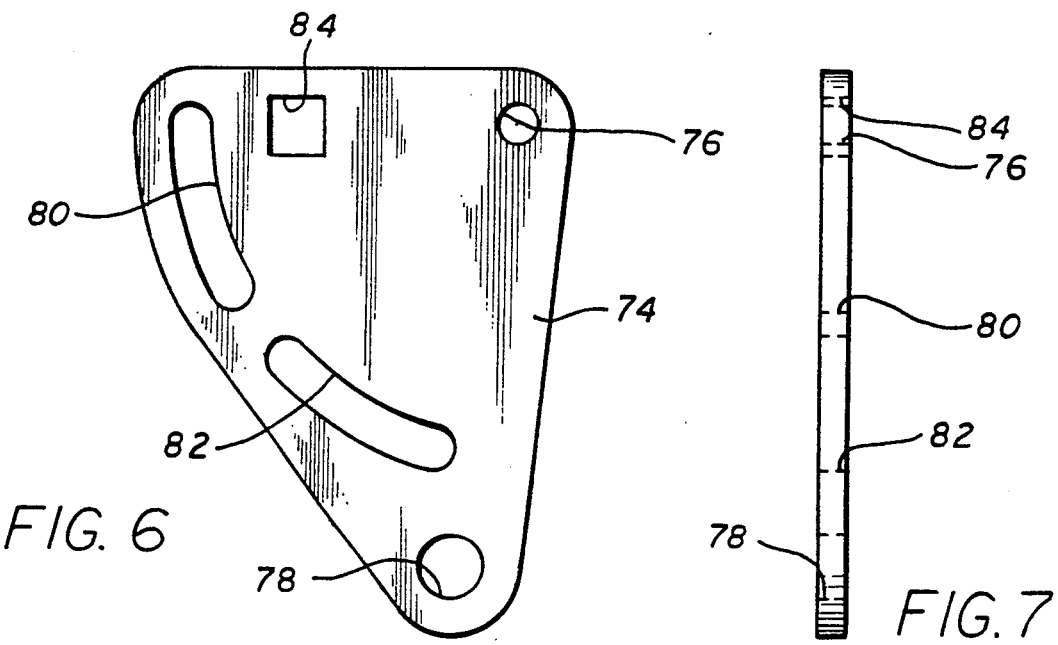
FIG. 6
FIG. 7
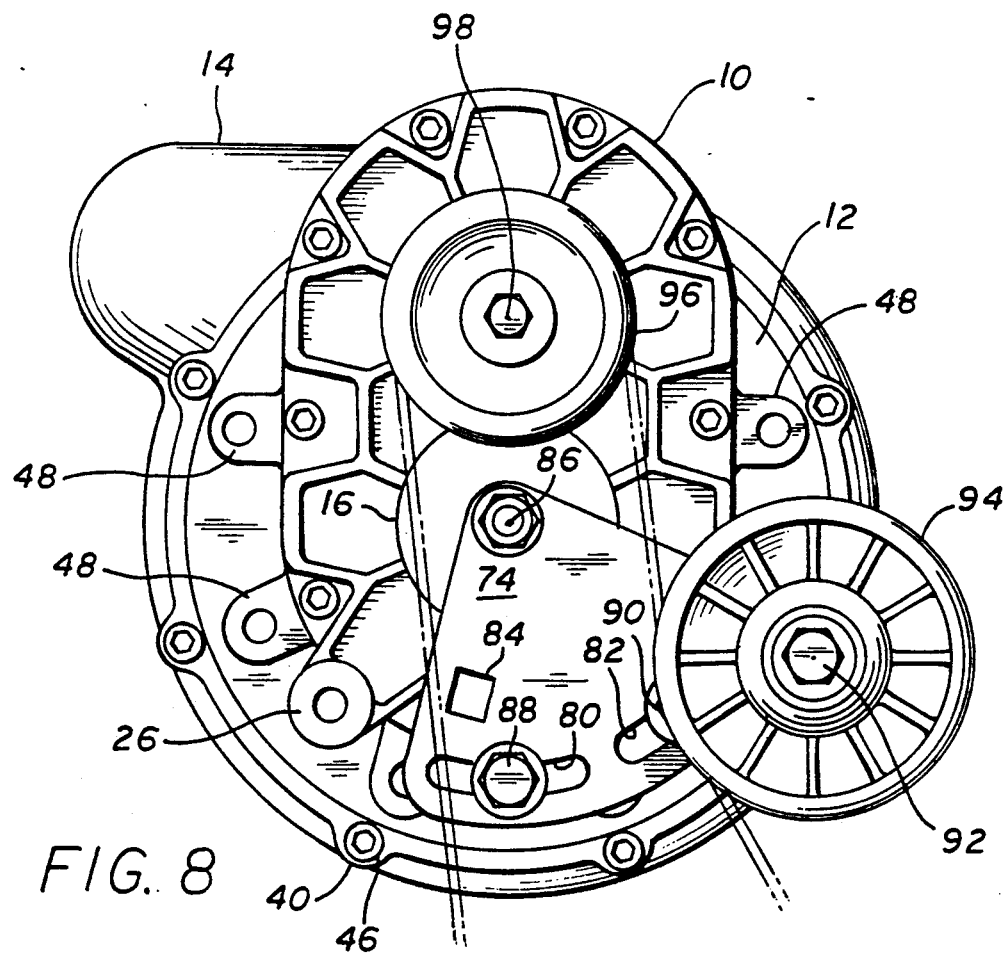
FIG. 8

SUPERCHARGER

BACKGROUND OF THE INVENTION

This invention relates to superchargers for internal combustion engines and more particularly to centrifugal superchargers of the type which are mechanically driven by the associated engine.

Supercharging of internal combustion engines is a well established method of obtaining greater power output from engines of a given size. In recent years because of problems with both availability and price of gasoline, engines have been made smaller to improve mileage. Some of the larger engines have been retained, especially for truck use, but have been derated as to horsepower. These measures have improved fuel mileage but performance has often been unsatisfactory.

The turbo-supercharger or turbocharger has become a popular option for getting greater power engines of all sizes, especially relatively small engines. While this is an effective means of getting greater horsepower out, there are some problems with this type of supercharger. Turbochargers, because they are exhaust driven, tend to raise temperatures in both the engine and engine compartment. Because of such heat, they also require special, more expensive materials not required by mechanically driven superchargers. Typically, oil change intervals are shorter than when no turbo-charger is installed; the high speed of the exhaust driven turbine which runs on bearings lubricated by the engine oil requires a certain amount of time to decelerate; consequently, the engine cannot or should not be stopped immediately since this may result in starving the turbine bearings (which run very hot) for oil over a significant time period. This can result in frequent replacement of those bearings. Since the engine exhaust flow drives the turbine, there is little such flow available at low speeds, consequently there is little power boost at low engine speeds. An additional disadvantage is that there is often a significant lag between the time the additional power is requested through depressing the accelerator pedal and the delivery of such power.

Because of the above problems there has been increased in interest in the type of supercharger which is driven directly by the engine through a mechanical link. Such superchargers have been available for decades but have enjoyed limited success because of susceptibility to wear, because of expense of installation, and at least partly because of limited space in the engine room. Further, since most engines are designed for forces resulting from normal aspiration, there is a concern about imposing additional bearing loads and other stresses from supercharging.

Although there has been a substantial amount of development work on turbochargers, no comparable amount of development effort has been expended on mechanically driven superchargers. This is at least partially due to the fact that, until very recently, no major auto manufacturer has been willing to fund the development expense to 1) develop a good system and 2) to adapt such a supercharger to several different models. Applicant has been aware of the above shortcomings of such superchargers and has recognized a need to provide a supercharger using current technology which o avoids most of the above disadvantages. There is a need for a supercharger which is durable, efficient, and readily installed on engines of different types.

BRIEF DESCRIPTION OF THE INVENTION

Applicant has designed a supercharger which includes certain features which significantly improve efficiency, which improve reliability and which provide substantial flexibility for installation on engines of different types. The supercharger unit itself takes filtered air, preferably from a cool location, in from the center of the compressor wheel which has radial vanes and which compresses the air over about one full revolution in a volute of increasing area before discharging the air essentially tangentially with respect to the vanes. The compressor wheel is located in a shallow bore which is of depth to receive the base or vane supporting part of the compressor wheel such that the air from the compressor wheel flows smoothly into the volute with no abrupt discontinuity or drop off to create turbulence or eddies.

The supercharger includes a drive shaft which carries an external pulley driven by the associated engine and an internal gear which drives a small gear connected to the compressor wheel through a driven shaft. Both the drive and the driven gear are standard with the gears representing about a 3.45:1 ratio for increased rotational speed of the compressor wheel, relative to engine speed, and both the drive and driven shaft are carried in ball bearings.

The housing includes a support for an external idler pulley for tensioning the drive belt with a plurality of bolt receiving bosses to provide for flexibility in locating the idler pulley relative to the drive pulley. Depending upon its installation, the belt may ride on the inside of the idler pulley (back side of the belt) or on the outside of the idler pulley. The housing also carries another series of bolt receiving bosses in an arcuate pattern at its lower end which provide flexibility in attachment to a number of different engine types. A mounting bracket having a series of matching holes supports the housing on the engine. This is a simple plate which may vary somewhat from engine to engine but which has bolt holes which match a combination of at least three of the bolt receiving bosses in the supercharger housing plus other holes for attachment to the engine block. This combination makes it possible to adapt the basic supercharger housing to a number of different engine installations.

BRIEF DESCRIPTION OF THE DRAWINGS

This invention may be more clearly understood from the following detailed description and by reference to the drawing in which:

FIG. 6 is a plan view of the idler pulley bracket used with the supercharger of FIGS. 1-5;

FIG. 7 is a side view of the bracket of FIG. 6;

FIG. 8 is a front elevational view of the supercharger with additional parts added to the view of FIG. 1.

DETAILED DESCRIPTION OF THE INVENTION

Figure 1:
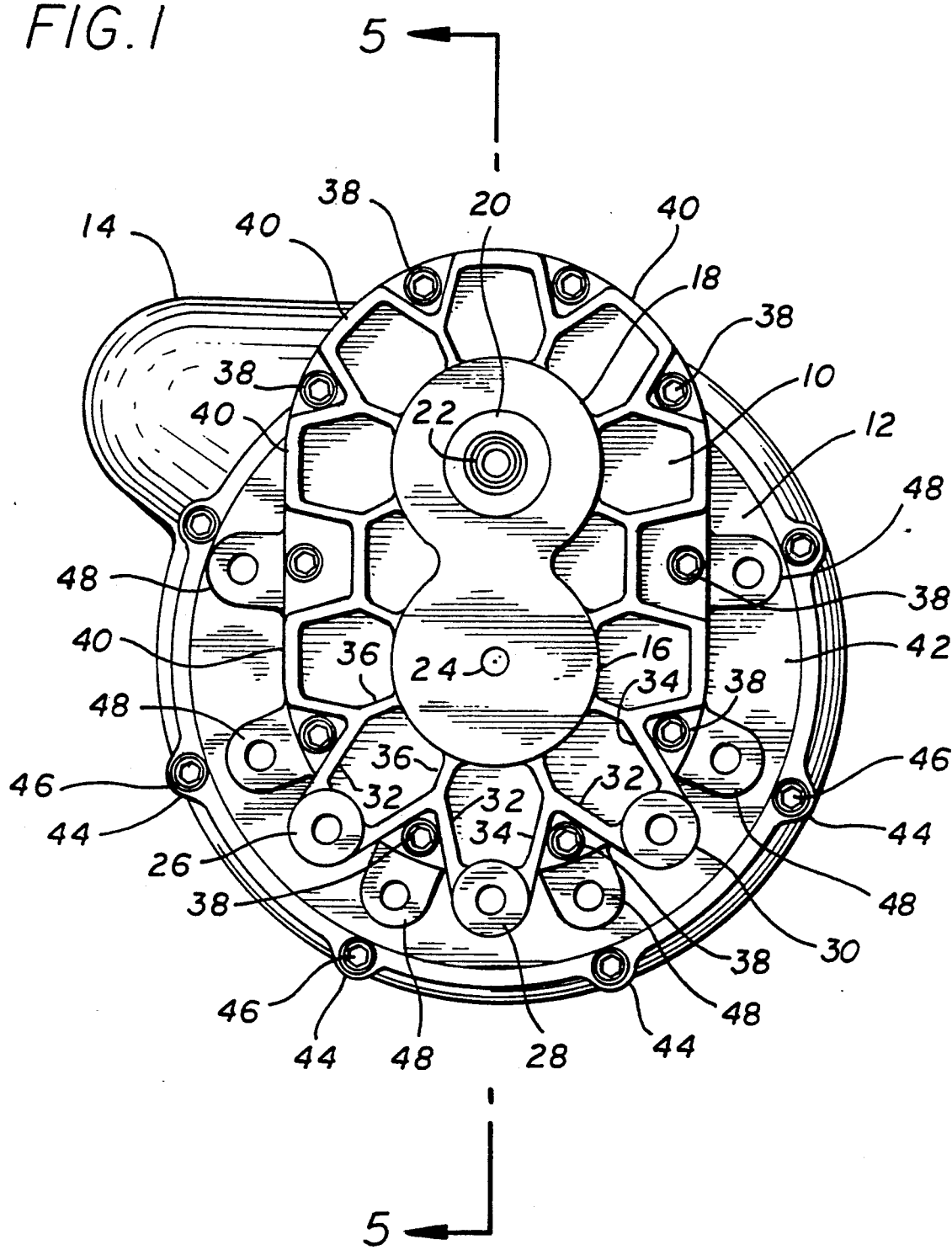
FIG. 1 is a front elevation view of the supercharger with certain parts deleted for clarity.

Referring now to FIG. 1, a front elevational view of the supercharger housing is shown including a case cover 10, a gear case 12, and a Volute 14, all of which are preferably aluminum castings. Case cover 10 includes a double boss 16 having a bore 18 for receiving a seal 20 and bearing (not shown) supporting a drive shaft 22. Centered in the lower part of double boss 16 is a bore 24 for receiving a bolt supporting an idler pulley bracket, discussed below. Also formed in case cover 10 are three bolt receiving bosses 26, 28, and 30 which also provide support for the idler pulley bracket. These bosses are located at the lower edge of the case cover 10 and each is supported by a pair of strengthening ribs 32 and 34 extending from itself to an additional rib 36 connected with the double boss 16. Located in the "Y" shaped space between ribs 32 and 24 and between similar spaces between other strengthening ribs at the upper end and the center of case cover 10 are a number of bolts 38 for attachment of case cover 10 to gear case 12. It will be observed that in addition to the more or less radially directed ribs similar to ribs 32, 34, and 36, there are generally circumferential ribs 40 attached to the ends of the generally radial ribs. Other rib configurations could also be used. As shown, bolts 38 are round head bolts with recessed "Allen" type receptacles for saving of space, but other suitable fasteners could be used.

Gear case 12 is visible to only a limited extent in FIG. 1 since it is behind the case cover 10. Shown on FIG. 1 is a large generally circular flange 42 which is attached to volute 14. Volute 14 includes a number of bosses 44 for receiving bolts 46 (which may be similar to bolts 38) for attaching gear case 12 to the volute 14. Also formed around the periphery of gear case 12 are a group of six fairly large and heavy bolt receiving bosses 48 which provide a number of possible attachment points for attaching the supercharger to a suitable bracket connected to the associated engine block. Flange 42 is shown in FIGS. 2 and 3 as a narrow member; in actuality it is inset into volute 14 and has somewhat greater thickness as is more clearly shown in the cross-sectional drawing of FIG. 5.

Figure 2:
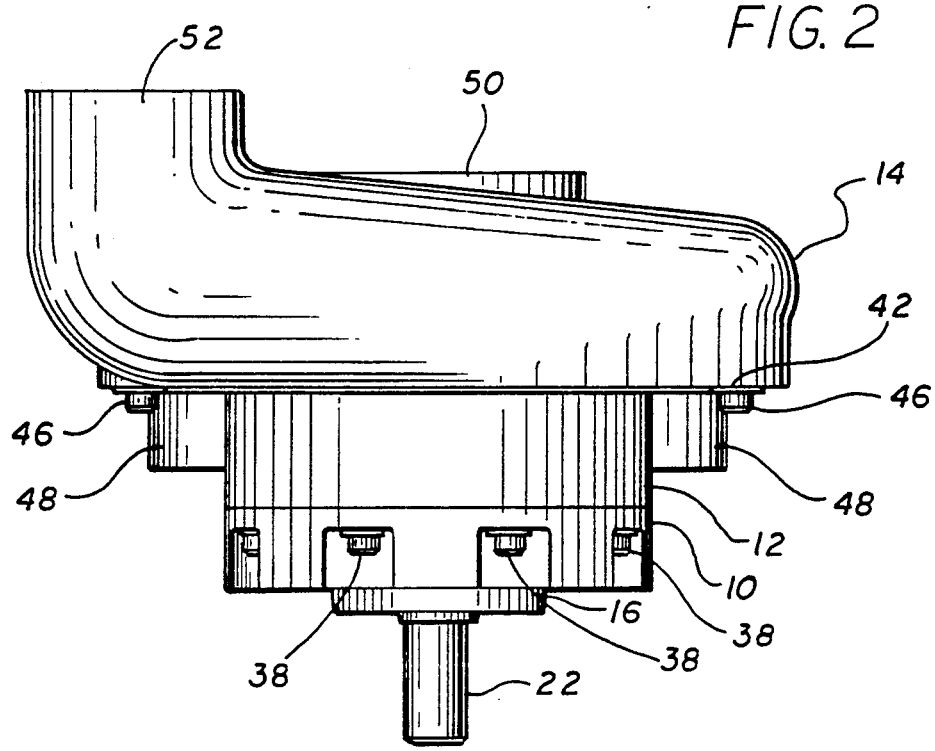
FIG. 2 is a top view of the supercharger of FIG. 1.
Figure 3:
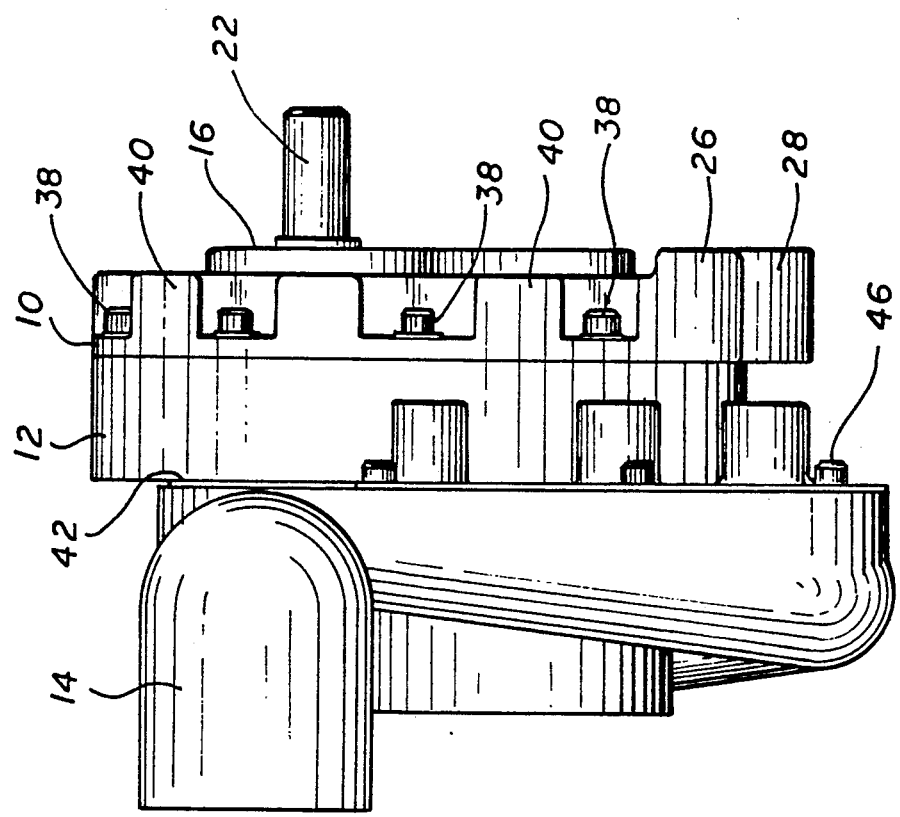
FIG. 3 is a left side view of the supercharger of FIG. 1.
Figure 4:
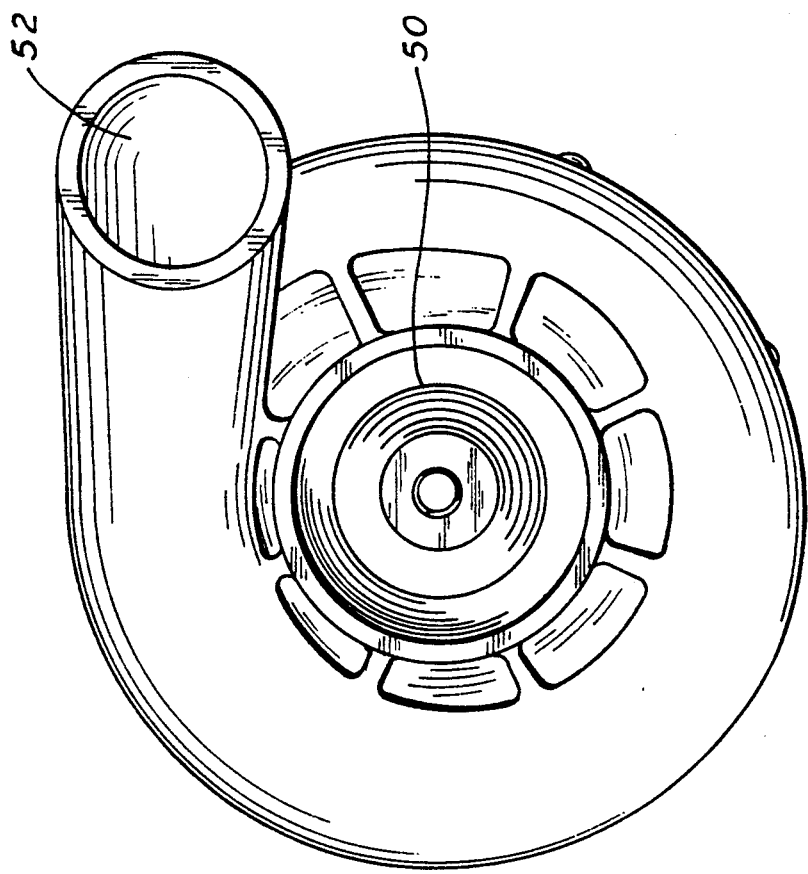
FIG. 4 is a rear view of the supercharger of FIG. 1.

FIGS. 2, 3, and 4 show the external configuration of the volute 14 which includes an inlet 50 at its center and an outlet 52 at its outer edge at the end of an air passage which essentially wraps one time around the housing. The compressor wheel (see FIG. 5) rotates at high speed in the volute 14, drawing air in through inlet 50 and causing it to be compressed by centrifugal force as it flows around the volute until it exits at outlet 52.

Figure 5:
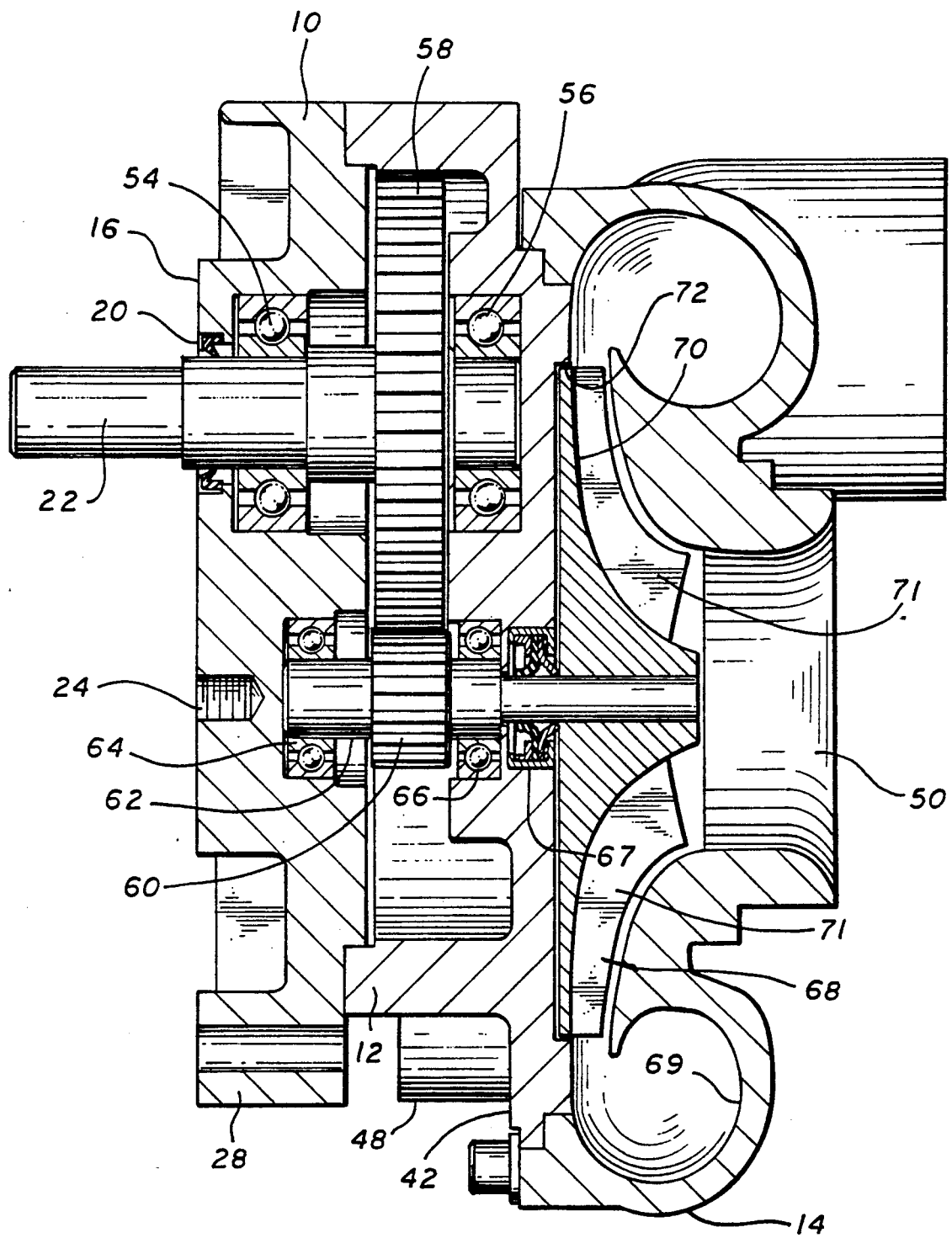
FIG. 5 is a view, partly in section, taken along line 5—5 of FIG. 1.

FIG. 5 is a sectional drawing taken along line 5—5 of FIG. 1. The drive shaft 22 is shown supported in case cover 10 in a ball bearing 54 and in gear case 12 in a ball bearing 56. A drive gear 58 of relatively large diameter is carried on shaft 22 and drives a smaller driven gear 60 which is carried on a driven shaft 62 supported on bearings 64 and 66. A high speed lip seal 67 is concentrically positioned around shaft 62. Driven shaft 62 carries the compressor wheel 68 which turns in a chamber 69 in the volute 14. Compressor wheel 68 has a disc like base 70 of significant thickness supporting a number of blades 71 and which rotates in a shallow bore 72 in the wall of gear case 12. This arrangement causes air flowing from the compressor wheel 68 into the volute 14 to flow very smoothly with essentially no losses from turbulence due to roughness between the blades 71.

FIG. 6 is a plan view of the idler pulley bracket 74 which is attached to the case cover 10. Bracket 74 is roughly triangular in shape and has a bore 76 in one corner or apex. At an opposite corner or apex is a bore 78 and arranged in an arc such that their centers are equidistant from the center of bore 76 are a pair of curved slots 80 and 82. As will been seen from FIG. 7, bracket 74 is simply a flat plate with the described openings. A rectangular hole 84 spaced from bore 76 fits a wrench of corresponding shape and is used to adjust the position of bracket 74.

FIG. 8 is a front elevational view of the supercharger similar to FIG. 1 but with parts added. Bracket 74 is fastened to the case cover 10 at bore 24 of FIG. 1 by means of a pivot bolt 86 passing through bore 76. Bolts 88 and 90 are passed through slots 80 and 82, respectively, and are fastened to case cover 10 at bosses 28 and 30 of FIG. 1 (covered in this view). Fastened to bracket 74 at hole 78 by means of a bolt and bearing combination 92 is an idler pulley 94. A drive pulley 96 is attached to drive shaft 22 by means of a bolt 98. Pulley 96 is also preferable secured to drive shaft 22 by means of a key and key way. The supercharger is driven by a belt carried on pulley 96 and driven from a pulley on the associated engine (not shown). Depending upon the installation, the belt may run over the outside of the idler pulley 94 or it may ride on the inside with the back side of the belt against the idler pulley. In either case the position of the idler pulley 94 will need to be adjusted to place proper tension on the belt. By putting a matching wrench with a reasonably long handle in square hole 84, and loosening bolts 86, 88 and 90, the bracket 74, and idler pulley 94, can be moved in an arc around bolt 86 to a wide range of positions. This range can be expanded if bolts 88 and 90 are placed in bosses 26 and 28, rather than 28 and 30. This bracket can also be reversed to provide greater flexibility in locating idler pulley 94.

Figure 9:
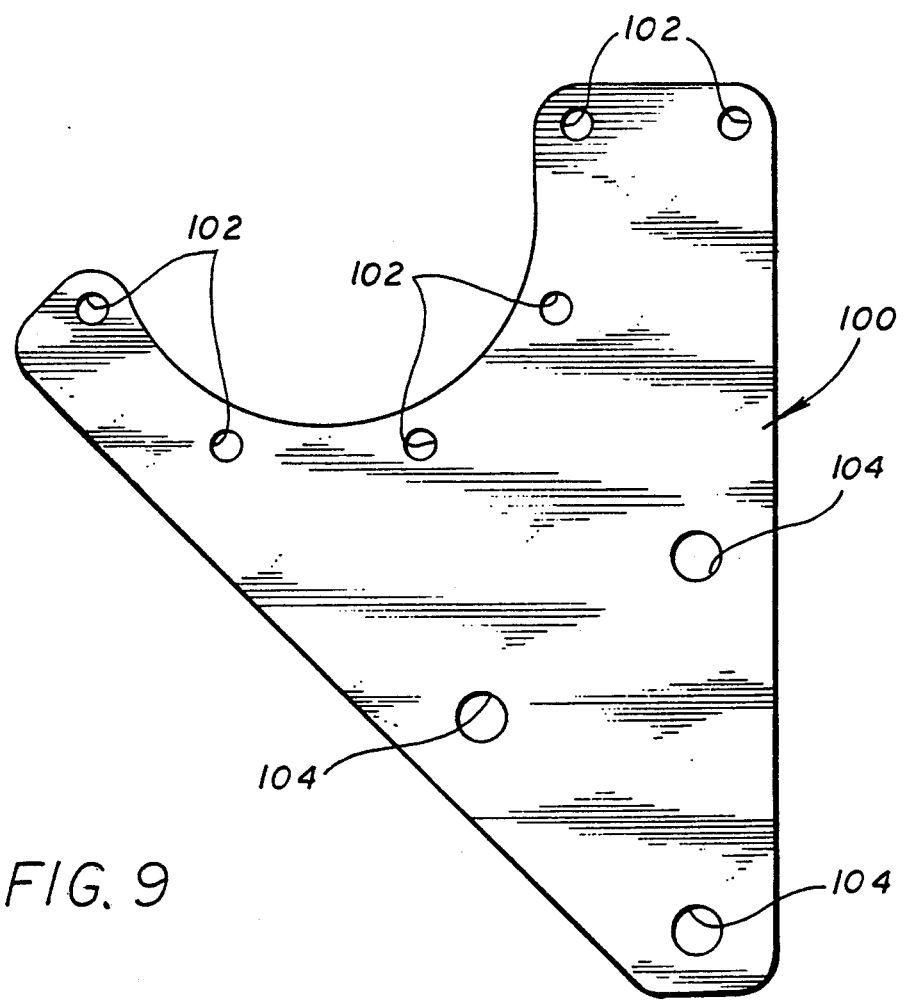
FIG. 9 is a plan view of a typical engine mounting bracket which might be used with the supercharger of FIGS. 1-8.

FIG. 9 is a plan view of a typical mounting plate 100 which may be used to support the supercharger on an engine. As noted above, gear case 12 carries a number (in this case-6) of heavy bolt receiving bosses 48. Plate 100 contains a number of holes 102 for receiving bolts which may match bosses 48 in a number of different possible combinations. Suitable additional holes 104 are provided for mounting plate 100 to its selected engine. This plate, which is quite simple to make, can be customized for each engine, if desired.

The above described embodiments of the present invention are merely descriptive of its principles and are not to be considered limiting. The scope of the present invention instead shall be determined from the scope of the following claims including their equivalents.

What is claimed is:

1. A supercharger system for an internal combustion engine comprising a centrifugal compressor including a housing having an inlet port for receiving air and an outlet port for discharge of compressed air to said engine, said compressor including a rotatable compressor wheel having a base part and radial vanes, and a volute enclosing said compressor wheel;

drive means for said compressor including a driven shaft supporting said compressor wheel, with a driven gear on said driven shaft, a driving shaft and a driving gear on said driving shaft in said housing engaging said drive gear, means driving said drive shaft, and means mounting said housing on said engine, said housing having an internal wall against which said compressor wheel is mounted, said wheel being counter sunk into said wall an amount substantially equal to the thickness of the base part of said compressor wheel supporting said vanes such that air flowing outwardly from said compressor wheel flows smoothly across said wall;

characterized in that said inlet port is located on said volute such that air enters said volute at the center of said compressor wheel and is compressed through a full circle, exiting said compressor wheel essentially tangentially thereof, and a generally triangular bracket is fastened to said housing spaced from said driving shaft having a first bolt hole at one apex and a bolt fastening said bracket to said housing, a second hole at another apex of said bracket, a short shaft anchored in said second hole and an idler pulley carried on said shaft, a pair of arcuate slot openings concentric with said first bolt hole and bolts in said slots threadedly engaged with said housing for locating said idler pulley at a desired location relative to said housing.

2. A supercharger system as claimed in claim 1 wherein said housing includes a plurality of bolt receiving bosses for receiving bolts in said slot openings.

3. A supercharger system as claimed in claim 2 wherein said system includes a mounting plate mounting said housing to engine and said housing includes a second group of bolt receiving bosses for receiving bolts fastening said housing to said mounting plate.

4. A supercharger system for an internal combustion engine comprising a centrifugal compressor including a housing having an inlet port for receiving air and an outlet port for discharge of compressed air to said engine, said compressor including a rotatable compressor wheel having a base part, and radial vanes, and a volute enclosing said compressor wheel;

drive means for said compressor including a driven shaft supporting said compressor wheel, with a driven gear or said driven shaft, a driving shaft and a driving gear on said driving shaft in said housing engaging said drive gear, means driving said drive shaft, and means mounting said housing on said engine;

characterized in that said housing has an internal wall against which said compressor wheel is mounted, said wheel being counter sunk into said wall an amount substantially equal to the thickness of the base part of said compressor wheel supporting said vanes such that air flowing outwardly from said compressor wheel flows smoothly across said wall;

a generally triangular bracket is fastened to said housing spaced from said driving shaft having a first bolt hole at one apex and a bolt fastening said bracket to said housing, a second hole at another apex of said bracket, a short shaft anchored in said second hole and an idler pulley carried on said shaft, a pair of arcuate slot openings concentric with said first bolt hole and bolts in said slots threadedly engaged with said housing for locating said idler pulley at a desired location relative to said housing; and said first bolt hole is coaxial with and spaced longitudinally from said driven shaft.

5. A supercharger system for an internal combustion engine comprising a centrifugal compressor including a housing having an inlet port for receiving air and an outlet port for discharge of compressed air to said engine, said compressor including a rotatable compressor wheel having a base part and radial vanes, and a volute enclosing said compressor wheel, said volute being so constructed that air enters said volute at the center of said compressor wheel and is compressed through a full circle exiting said compressor wheel essentially tangentially of said compressor wheel;

said housing including a wall adjacent said compressor wheel and a shallow bore in said wall of depth essentially equal to the thickness of the base part of said compressor wheel at its outer edge such that air flowing outwardly from said compressor vanes flows smoothly across said wall;

drive means for said compressor including a driven shaft supporting said compressor wheel, bearing means supporting said driven shaft in said housing, and a driven gear on said driven shaft, a driving shaft, bearing means supporting said driving shaft in said housing, a drive gear on said driving shaft engaging said driven gear and a driven pulley on said driving shaft exterior of said housing;

a generally triangular bracket is fastened to said housing spaced from said driving shaft having a first bolt hole at one apex and a bolt fastening said bracket to said housing, a second hole at another apex of said bracket, a short shaft anchored in said second hole and an idler pulley carried on said shaft, a pair of arcuate slot openings concentric with said first bolt hole and bolts in said slots threadedly engaged with said housing for locating said idler pulley at a desired location relative to said housing; and means mounting said housing on said engine including drive means for driving said pulley.

6. A supercharger system as claimed in claim 5 wherein said generally triangular bracket includes a tool receiving port spaced from said first bolt hole for receiving a tool to provide leverage to cause said bracket to be rotated around said first bolt to locate said idler pulley where desired.

7. A supercharger system for an internal combustion engine comprising a centrifugal compressor including a housing having an inlet port for receiving air and an outlet port for discharge of compressed air to said engine, said compressor including a rotatable compressor wheel having a base part, and radial vanes, and a volute enclosing said compressor wheel;

said housing including a wall adjacent said compressor wheel and a shallow bore in said wall of depth essentially equal to the thickness of the base part of said compressor wheel at its outer edge such that air flowing outwardly from said compressor vanes flows smoothly across said wall;

drive means for said compressor including a driven shaft supporting said compressor wheel, bearing means supporting said driven shaft in said housing, and a driven gear on said driven shaft, a driving shaft, bearing means supporting said driving shaft in said housing, a drive gear on said driving shaft engaging said driven gear and a drive pulley on said driving shaft exterior of said housing;

means mounting said housing on said engine including drive means for driving said pulley;

a generally triangular bracket is fastened to said housing spaced from said driving shaft having a first bolt hole at one apex and a first bolt fastening said bracket to said housing, a second hole at another apex of said bracket, a short shaft enclosed in said second hole and an idler pulley carried on said shaft, a pair of arcuate slot openings concentric with said first bolt hole and bolts in said slots threadedly engaged with said housing for locating said idler pulley at a desired location relative to said housing; and said first bolt hole is coaxial with and spaced longitudinally from said driven shaft.

8. For use with an internal combustion engine, a supercharger system comprising a centrifugal compressor including a housing having an inlet port for receiving air and an outlet port for discharge of compressed air to said engine, said compressor including a rotatable compressor wheel having a base part and radial vanes and a volute enclosing said compressor wheel;

drive means for said compressor including a driven shaft supporting said compressor wheel, bearing means supporting said driven shaft in said housing, and a driven gear on said driven shaft, a driving shaft, bearing means supporting said driving shaft in said housing, and a drive gear on said driving shaft engaging said driven gear and a drive pulley on said driving shaft exterior of said housing; and means mounted on said housing including a generally triangular bracket having a first bolt hole at one apex and a pivot bolt fastening said bracket to said housing at a location on the same aside of said housing as said drive shaft and spaced therefrom, a second hole at an opposite corner of said bracket, an idler pulley, and a shaft supported in said second hole and said idler pulley supported on said shaft, a pair of arcuate slot openings concentric with said first bolt hole, and bolts in said slots threadedly engaged with said housing for anchoring said idler pulley at a desired position relative to said housing, said first bolt hole being coaxial with and spaced longitudinally from said driven shaft.

9. A supercharger system as claimed in claim 8 wherein said generally triangular bracket includes a tool receiving port spaced from said first bolt hole for receiving a tool to provide leverage to cause said bracket to be rotated around said pivot bolt to locate said idler pulley where desired.

10. A supercharger system as claimed in claim 8 wherein said housing includes a wall adjacent said compressor wheel, said wall being indented over the area of said compressor wheel by approximately the thickness of the base part of said compressor wheel supporting said vanes such that air flowing outwardly from said compressor vanes flows smoothly across said wall.

11. A supercharger system as claimed in claim 8 wherein said housing includes a plurality of bolt receiving bosses for receiving the bolts in said slots.

12. A supercharger system as claimed in claim 11 wherein said system includes a mounting plate mounting said housing to said engine and said housing includes a second group of bolt receiving bosses for receiving bolts fastening said housing to said mounting plate.

* * * * *